Oct. 18, 1960  R. S. RAE  2,956,402
MULTISTAGE HIGH ALTITUDE ENGINE WITH SINGLE COMBUSTION STAGE
Filed June 27, 1955  3 Sheets-Sheet 1
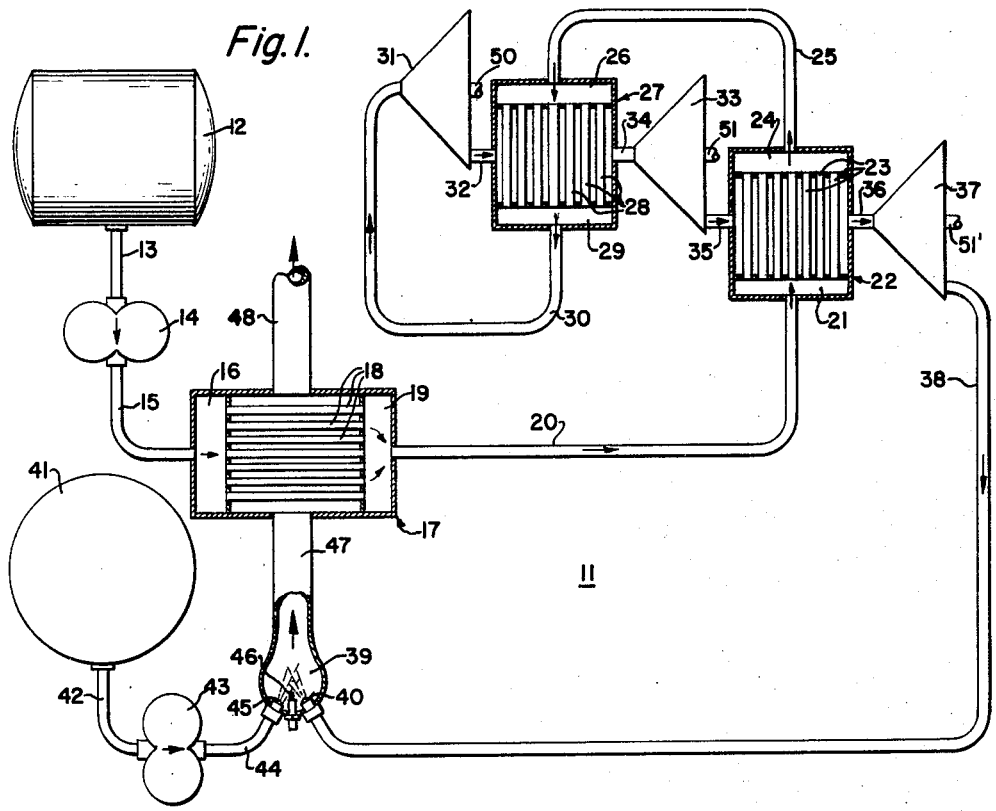
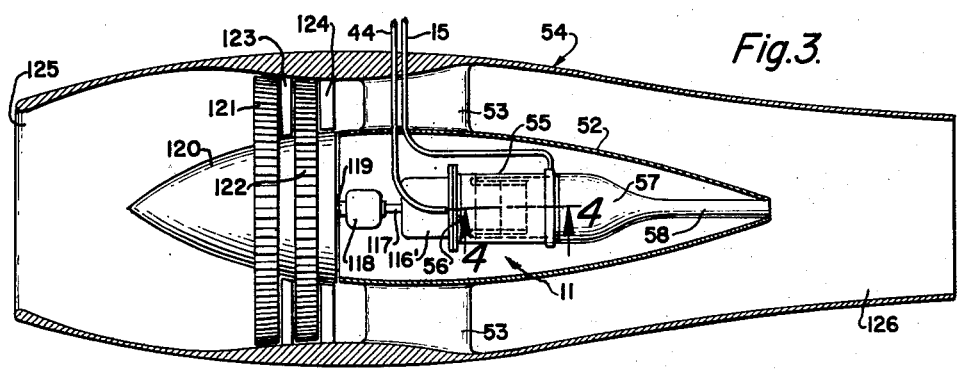
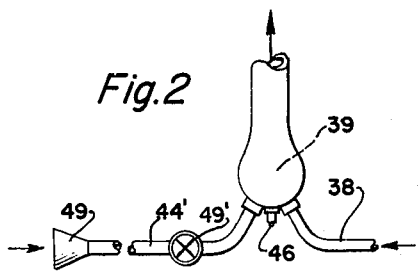
RANDOLPH SAMUEL RAE,
INVENTOR.
BY R. E. Giauque
ATTORNEY.

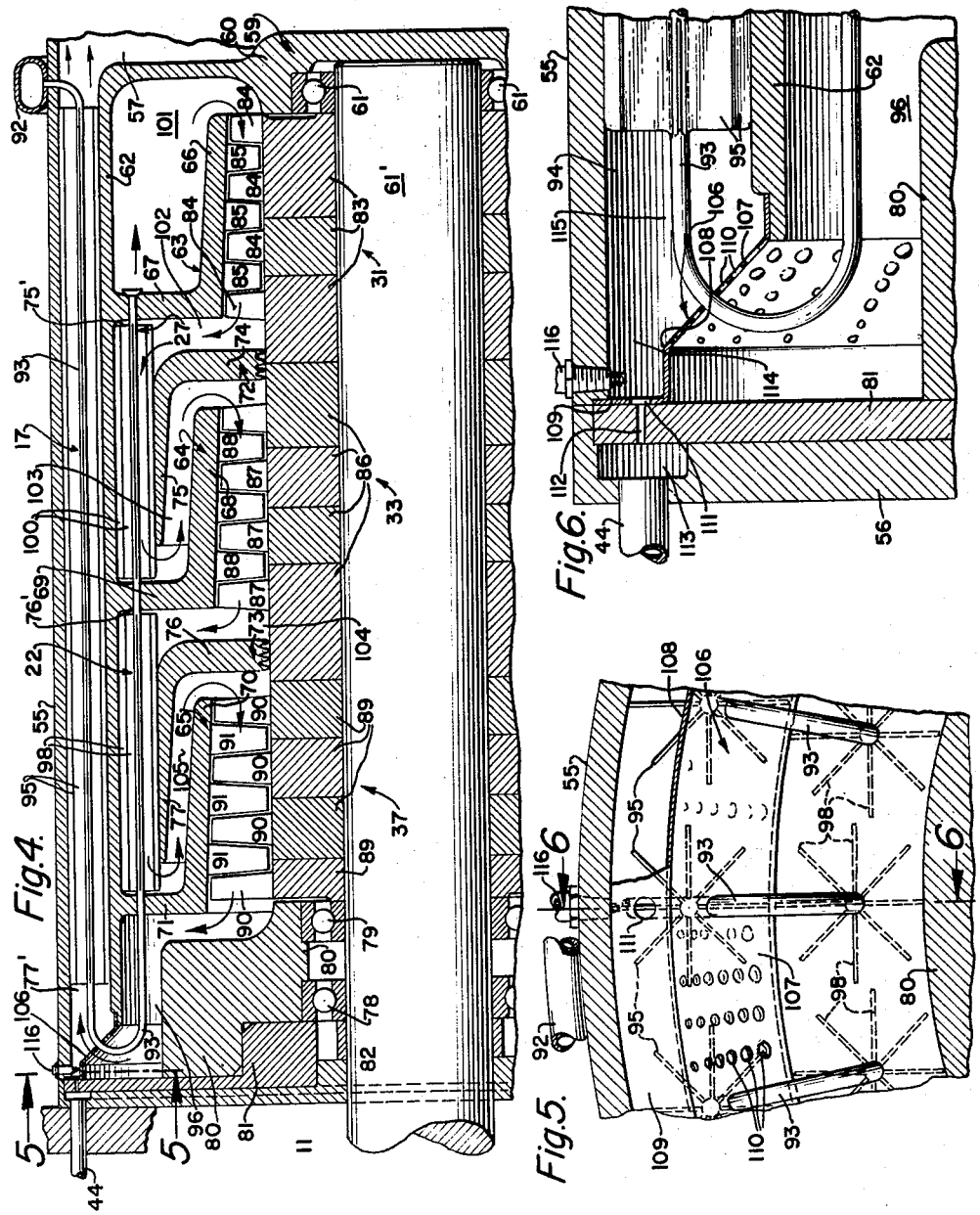
RANDOLPH SAMUEL RAE,
INVENTOR.
BY R. E. Giauque
ATTORNEY.

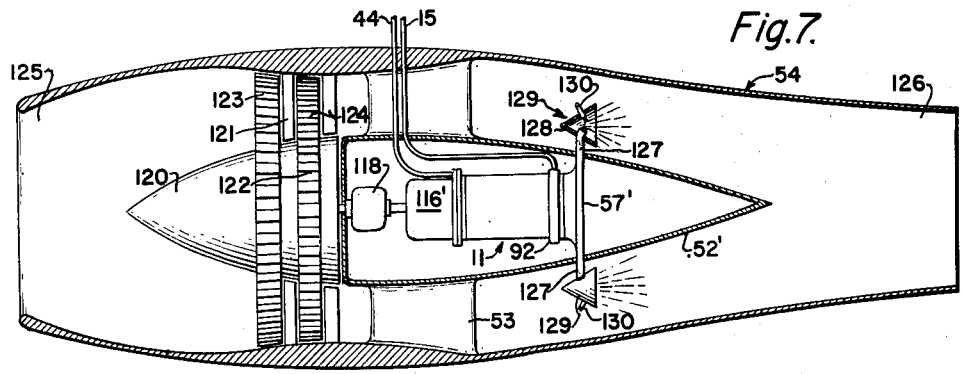
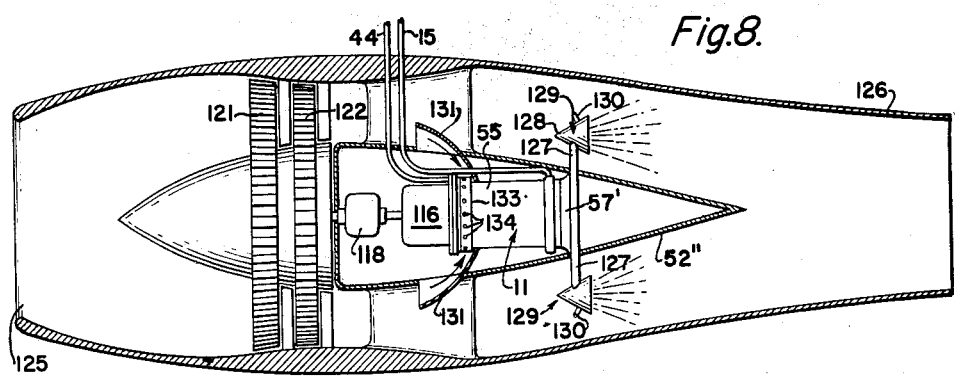
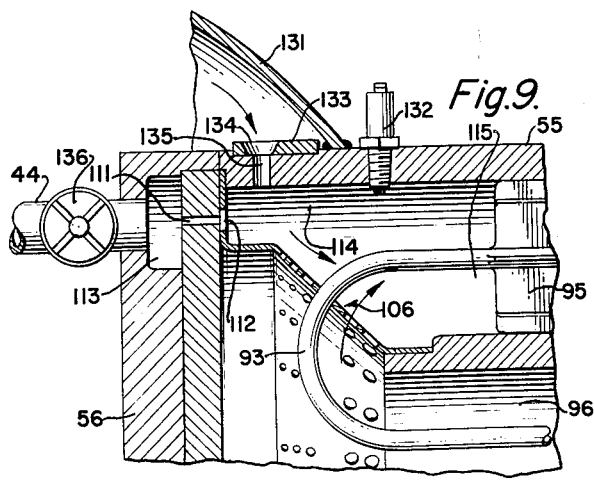
RANDOLPH SAMUEL RAE,
INVENTOR.
BY R. E. Geauque
ATTORNEY United States Patent Office
2,956,402
Patented Oct. 18, 1960

2,956,402

MULTISTAGE HIGH ALTITUDE ENGINE WITH SINGLE COMBUSTION STAGE

Randolph Samuel Rae, Los Angeles, Calif., assignor to The Garrett Corporation, Los Angeles, Calif., a corporation of California Filed June 27, 1955, Ser. No. 518,049

9 Claims. (Cl. 60—39.02)

This invention relates to a multistage high altitude engine utilizing a single combustion stage and more particularly to a multistage high altitude engine utilizing hydrogen as the working fluid and as a fuel and having a single combustion stage to provide a heat source for the hydrogen gas prior to entering the stages of the engine. By having a single combustion stage which is utilized to heat the uncombusted hydrogen gas entering the stages of the engine as the working fluid, a variety of oxidants can be used with the exhaust hydrogen for the purpose of heating the working fluid.

The engine of the present invention can be divided into any number of expansion stages, which can consist of expansion turbines, expansion gas engines or the like, and the hydrogen gas exhausted from the engine can be utilized as fuel to regulate the temperature of the hydrogen working fluid at the inlet to each stage so that a desired temperature which can be withstood by each stage is maintained but not exceeded. The hydrogen working fluid on its way to the engine stages is passed through a first heat exchanger which is also connected to the single combustion chamber and the hydrogen working fluid is heated in this heat exchanger to a temperature in excess of that which could be withstood by any stage of the engine. The high temperature hydrogen is then passed serially through heat exchangers located at the inlet to all stages except the first stage and after having passed through these heat exchangers, the temperature of the hydrogen gas has been reduced so that it can enter directly the inlet of the first stage of the engine. The exhaust from the last stage of the engine consists of pure hydrogen gas which is then combusted in the single combustion chamber with any suitable oxidant in order to provide the heating medium for the first heat exchanger. Thus, the engine consists of a supply of hydrogen which is heated on its way to the stages of the engine and then the temperature of the hydrogen is reduced in stages so that it can enter the first stage of the engine at the proper temperature. The exhaust from each of the stages except the last stage is raised in temperature by the hydrogen passing to the first stage as the working fluid. It is therefore apparent that a hydrogen engine is provided which is substantially independent of the type of oxidant used in the combustion chamber so that the oxidant supply to the combustion chamber can be varied in accordance with the conditions under which the engine is operated. For instance, under certain conditions it may be more advantageous to utilize oxygen as the oxidant supply, whereas under other conditions it may be more practical to utilize air as the oxidant supplied to the combustion chamber to heat the entering hydrogen.

When the engine is utilized to propel an aircraft, it is feasible to use atmospheric air as the oxidant for the engine at lower altitudes where the density of the air is substantial. However, at very high altitudes, it may be necessary to utilize oxygen as the oxidant because of the low density of the air. The use of a single combustion chamber also makes possible the variation in the heat exchanger design utilized to heat the hydrogen going to the engine as the working fluid so that the proper type of heat exchanger can be utilized for any type of oxidant utilized in the combustion chamber to combust the hydrogen exhausted from the last stage of the engine. The only requirement for the combustion chamber and the oxidant supply is that sufficient thermal energy be imparted to the hydrogen passing through the stages of the engine.

In co-pending U.S. patent application, Serial No. 417,867, filed March 22, 1954, by Randolph S. Rae, there is disclosed a form of engine which utilizes hydrogen gas as the working medium, and this form of engine utilizes three separate combustion chambers to regulate the inlet temperature to each stage. Also, in another form of engine illustrated in this application, a single combustion chamber is utilized to combust the hydrogen with an oxidant and thereby produce a high temperature working fluid. In this latter form of engine, the combustion takes place with high pressure hydrogen and oxidant and the working fluid contains combustion products as well as pure hydrogen. While the present invention utilizes the basic heat exchanger cycle disclosed in the above identified application, the combustion chamber is located in the exhaust line from the last stage of the engine and receives low pressure hydrogen which is combusted to increase the temperature of hydrogen going to the engine as the working fluid. Thus, by combusting the low pressure hydrogen to obtain the temperature increase in the working fluid, oxidants, such as low pressure air and oxygen, can be combusted with the hydrogen without pumping the oxidant to a high pressure and a variety of oxidants can be used because of the low pressure requirement. Also, by using only a single combustion chamber, rather than a plurality of combustion chambers, it is much easier to regulate the engine to obtain the proper temperatures at the inlet to each of the stages.

While the engine of the present invention is illustrated as comprising three stages, it is of course understood that any desired number of stages can be utilized depending on the particular application under consideration to obtain a reasonable compromise between specific fuel consumption and the mechanical complexity of the engine. Hydrogen is the most suitable working fluid since it has such a high specific heat value, about 15 times greater than most gases, and also is one of the best fuels for use in the combustion chamber. By the use of several expansion stages in the engine of the present invention, it is possible to control the temperature of the hydrogen gas in each stage so that it will not exceed the temperatures which can be withstood by the materials now in use in practical expansion engines.

The engine of the present invention can be utilized to drive the propellers for a high altitude aircraft or to drive a compressor located within a duct to provide jet thrust for the aircraft. Because of the small size of the engine, it can be located within an inner body in such a duct and can be positioned to directly drive the compressor. Also, because of the fact that not all of the hydrogen leaving the last stage of the engine will be combusted in the combustion chamber to heat the inlet hydrogen working fluid, the engine exhaust can be connected to afterburners located behind the compressor in the duct and the hydrogen exhaust gas can be combusted with air being forced through the duct by the compressor. Of course, the combustion of the hydrogen in the exhaust with the air will raise the temperature of the air passing through the duct and thus, increase the thrust of the engine resulting from rotation of the compressor. Since the engine is located within the duct, a supply of air from the compressor is available as the oxidant for the hydrogen. Also, a separate supply of oxygen can be carried by the aircraft as an additional oxidant supply for the combustion chamber. At relatively low altitudes, where the air is relatively dense, the discharged air from the compressor can be utilized as the oxidant for the combustion chamber and regulating means are provided to shut off the air supply to the engine and supply oxygen as the oxidant at relatively high altitudes. Thus, the use of air as the oxidant at low altitudes substantially reduces the amount of oxygen which would have to be carried by the high altitude aircraft.

It is therefore an object of the present invention to provide a multistage high altitude engine utilizing hydrogen as the working fluid and having a single combustion chamber located in the exhaust from the last stage of the engine to raise the temperature of the hydrogen passing to the engine as the working fluid.

Another object of the present invention is to provide a multistage high altitude engine in which the hydrogen exhaust from the engine is combusted with any suitable oxidant to heat hydrogen gas passing to the engine as the working fluid to a temperature such that the hydrogen entering the first stage of the engine will be at an acceptable temperature after having raised the inlet gas to the remaining stages to the proper temperature.

A further object of the invention is to provide a multistage high altitude engine utilizing hydrogen as a working fluid of very high specific heat and utilizing a single combustion chamber to heat the hydrogen entering the engine, said combustion chamber being designed to use any suitable oxidant and the hydrogen exhausted from the engine.

A still further object of the invention is the provision of a propulsion unit for a craft in which a multistage high altitude engine, utilizing hydrogen as the working fluid, drives a compressor located within a duct in order to provide a propelling thrust for the craft and the exhaust from the multistage engine is discharged directly into the duct after a portion of the hydrogen in the exhaust has been combusted to raise the temperature of the hydrogen working fluid entering the engine as the working medium.

Another object of the present invention is to provide a propulsion unit having a multistage high altitude engine utilizing hydrogen gas as the working medium and a single combustion chamber for controlling the inlet temperature of the hydrogen gas going to the engine, said combustion chamber utilizing a portion of the hydrogen in the exhaust from the engine and the remaining hydrogen in the exhaust is then passed to an afterburner where it is combusted with the air passing through a duct or with an oxygen supply carried for the engine.

These and other objects of the invention not specifically set forth above will become readily apparent from the following description and drawings in which:

Figure 1 is a schematic view of the engine of the present invention showing the single combustion chamber and the various heat exchangers.

Figure 2 is a schematic view of a modified form of combustion chamber wherein air is utilized as the oxidant.

Figure 3 is a schematic illustration of a propulsion unit having a compressor located within a duct and utilizing the engine of the present invention which exhausts into the duct.

Figure 4 is a fragmentary section along line 4—4 of Figure 3 showing a structural form of the engine in which all of the stages of the engine are connected to a common output shaft.

Figure 5 is a transverse vertical section along line 5—5 of Figure 4, illustrating the arrangement of the various heat exchangers for the engine.

Figure 6 is a section along line 6—6 of Figure 5 showing the combustion chamber for the engine.

Figure 7 is a schematic view of a modification of the engine and propulsion unit in which the exhaust leaving the combustion chamber of the engine is combusted in an afterburner in order to increase the thrust of the propulsion unit.

Figure 8 is a second modification of the engine and propulsion unit in which the exhaust from the combustion chamber is combusted in an afterburner and in which regulating means are provided to utilize oxygen or air, as a mixture thereof, as the oxidant.

Figure 9 is a section, similar to Figure 6, of the modified form of combustion chamber for use with the modification illustrated in Figure 8.

Referring to Figure 1, the multistage high altitude engine 11 has a tank 12 connected by passage 13 to a pump 14 and the high pressure discharge of the pump is connected through a passage 15 to the header 16 of a heat exchanger unit 17. The tank 12 contains liquid hydrogen at atmospheric pressure and at the liquefaction temperature. Pump 14 serves to increase the pressure of the liquid hydrogen drawn from tank 12 to a high pressure which can be either below or above the critical pressure. This increase in pressure serves to increase the efficiency of the engine since if the discharge of the pump is above the critical pressure, no heat of evaporation need be provided for the hydrogen and if the discharge from the pump is just below the critical pressure, less heat of evaporation need be provided than at a low pressure, such as the pressure in the storage tank. The high pressure hydrogen in header 16 passes through a plurality of passages 18 in heat exchanger unit 17 and is discharged into a header 19 which connects with a passage 20. If the hydrogen is in liquid form when it enters the header 16, the liquid will be evaporated so that the passage 20 will contain high pressure, high temperature hydrogen gas. Sufficient heat energy is transferred to the hydrogen in passing through the heat exchanger unit to raise the hydrogen gas to a high temperature which is well above the temperature which can be withstood by the materials of any stage of the engine. The passage 20 connects with an inlet header 21 of a second heat exchanger unit 22 and the high temperature hydrogen gas passes from header 21 through a plurality of passages 23 and is collected by a header 24. In the second heat exchanger 22, the hydrogen gas exhausting from the next to the last stage of the engine is heated to the highest temperature which is acceptable by the last stage of the engine, and the temperature of the hydrogen gas leaving heat exchanger unit 22 by passage 25 is reduced. However, the temperature of the gas in passage 25 is still above the temperature which is acceptable to the stages of the engine. The passage 25 directs the hydrogen gas at reduced temperature to an inlet header 26 of a third heat exchanger unit 27, and from header 26, the hydrogen gas passes through a plurality of passages 28 and enters the header 29. The passage of the hydrogen gas through the heat exchanger unit 27 will serve to heat the exhaust from the first stage of the engine to the highest temperature which can be withstood by the second stage of the engine. The discharge from header 29 through passage 30 will be at a temperature lower than the hydrogen gas in passage 25 and at a temperature which will be acceptable to the first stage of the engine.

The high pressure, high temperature hydrogen gas entering the first stage 31 from passage 30 will be expanded in this stage and will exhaust to heat exchanger unit 27 through passage 32. Thus, the hydrogen in passage 32 will be at a reduced temperature and pressure. The exhaust from first stage 31 in passing through the heat exchanger unit 27 will be increased to a temperature which can be withstood by the second stage 33 and the hydrogen gas will be introduced to the second stage through passage 34. A passage 35 connects the exhaust from the second stage 33 to the heat exchanger unit 22 and the hydrogen gas in passage 35 will be at a reduced pressure below that in passage 34 and also at a reduced temperature. The heat exchanger 22 will increase the temperature of the hydrogen in passage 35 so that when it leaves the heat exchanger through passage 36 to third stage 37, it will be at the maximum temperature which can be withstood by this stage. A passage 38 receives the exhaust from the third stage 37 and connects with a combustion chamber 39 through a jet fitting 40 and of course the hydrogen gas in passage 38 is at a temperature and pressure below that at which it enters the third stage 37.

A tank 41 is utilized to house the oxidant for the engine, which can be liquid oxygen at atmospheric pressure and liquefaction temperature but any other suitable oxidant could be stored in tank 41. A passage 42 connects tank 41 with a pump 43 which in turn discharges the oxygen into the combustion chamber 39 through a passage 44 connected with a jet fitting 45. When liquid oxygen is stored in tank 41, the pressure of the liquid oxygen will be regulated by pump 43 to the pressure required in the combustion chamber corresponding to the pressure of the hydrogen in passage 38 and the liquid oxygen will be sprayed through nozzle 45 and combusted with hydrogen being discharged from nozzle 40. Ignition in the combustion chamber is accomplished by a spark igniter 46 and the high temperautre products of combustion will pass through the passage 47 and enter the heat exchanger unit 17, in order to provide the proper high temperature for the hydrogen gas leaving the heat exchanger in passage 20. The passage 47 will also contain some high temperature uncombusted hydrogen gas in addition to the products of combustion, which hydrogen gas is a very excellent heating medium because of its very high specific heat. The passage 48 can either discharge to atmosphere or to any other waste source or can be connected with an afterburner in a manner later to be described. It is understood that any suitable oxidant can be utilized in combustion chamber 38, such as high pressure atmospheric air.

Referring to Figure 2, a modification of the combustion chamber is illustrated wherein the passage 44' connects with an air scoop 49 which receives air at the proper pressure for the combustion chamber. And, of course, a valve 49' (or pump) could be placed in passage 44' to regulate the pressure of the air received from the scoop in the event that the air pressure does not correspond with the pressure of the hydrogen in passage 38. The passage 44' connects to the nozzle 45, and the passage 38 supplies hydrogen gas to the combustion chamber through nozzle 40, as in the previous embodiment, so that the spark igniter 46 will ignite the air and hydrogen within the combustion chamber. The stages 31, 33 and 37 have output shafts 50, 51 and 51', respectively, which are connected together to a common drive shaft in order to combine the outputs of the stages. While the stages are illustrated as expansion turbines, it is understood that other types of expansion engines can be utilized for each stage and it is also understood that additional stages can be added to the engine with a heat exchanger positioned at the inlet of each additional stage to raise inlet temperature.

The operation of the high altitude engine 11 will now be described in connection with Figure 1 and examples of hydrogen temperatures throughout the engine will be given for purposes of illustration only. It is understood that the hydrogen temperature in the various stages of the engine can be varied in accordance with the engine design. Assuming that the temperature limit for each of the stages of the engine is 1500° F., sufficient hydrogen and oxidant will be combusted in combustion chamber 39 to heat the hydrogen entering the heat exchanger 17 from passage 15 to a temperature of about 2000° F. At this high temperature, hydrogen in passage 20 will pass through heat exchanger unit 22 to increase the temperature of the exhaust from stage 33. In passage 35, the gas is at about 1250° F. and the gas as it enters the stage 37 through passage 36 will be at about 1500° F. Also, the heat exchanger unit 22 will reduce the temperature of the hydrogen in passage 25 to about 1750° F. and this hydrogen, in passing through heat exchanger 27, will heat the gas leaving stage 31 through passage 32 from about 1250° F. to 1500° F. so that the gas in passage 34 entering stage 33 will be at the highest possible temperature. In passing through the heat exchanger unit 27, the pure hydrogen gas from passage 25 will be reduced in temperature so that its temperature in passage 30 will be about 1500° which is the highest suitable temperature for stage 31 of the engine. Thus, it is seen that the high temperature of the gas in passage 20 is reduced by the heat exchangers 22 and 27 and the gas leaves the heat exchanger unit 27 at a suitable temperature for stage 31. The reduction in temperature taking place in each of the heat exchanger units 22 and 27 is accompanied by an increase in temperature of the hydrogen entering each of the stages 33 and 37 to about 1500° F. Thus, the hydrogen gas entering each of the stages will be at approximately the same temperature and at the highest possible temperature for safe operation of the turbines. The exhaust from stage 37 will be at about 1250° F. in passage 38 and will, of course, be pure hydrogen gas. A portion of the pure hydrogen in passage 38 will be combusted in combustion chamber 39 with oxidant from passage 44 to increase the temperature of the remaining combustion products and uncombusted hydrogen in passage 49 to a temperature which will assure that the hydrogen gas in passage 20 is at the proper temperature of 2000° F. The heating gases from the combustion chamber will leave the heat exchanger unit 17 through passage 48. By regulating the rate of flow of hydrogen gas through the engine and by regulating the amount of combustion taking place in the combustion chamber 39, it is understood that the temperature throughout the engine can be adjusted to any suitable values corresponding to the desired operation. Since pure hydrogen gas is utilized as the working fluid in all of the stages, the best possible working fluid is available because of the very high specific heat of the hydrogen. In other words, by using pure hydrogen gas as the working fluid in all stages and heat exchangers, more energy per pound of diluent or working fluid is available at any given temperature than is available from most other known stable materials. When oxygen is utilized as an oxidant in a combustion chamber 39, the gases in passage 48 will consist of uncombusted hydrogen and steam whereas if air is used as the oxidant, the gases in passage 48 will consist of uncombusted hydrogen, nitrogen and steam, so that some uncombusted hydrogen will be available as a working fluid in heat exchanger 17.

The engine 11 can be utilized for the propulsion of high altitude aircraft but of course is not limited to such purposes since it has general application as a power source. If a supply of oxygen in tank 41 is utilized as the oxidant, the engine operates independently of its surrounding medium and thus, would be suitable for underwater operation as well as for high altitude operation. In Figure 3, the engine 11 is shown mounted within an inner body 52 which is supported by struts 53 within a duct 54. The structural embodiment of the engine 11 contained within inner body 52 is illustrated in Figure 4. The engine has an outer circular casing 55 which is closed at one end by a plate 56. The other end of the engine consists of a chamber 57 which connects with the exhaust passage 58 of the engine leading through the inner body 52 and communicating with the aft portion of the duct 54. A structural member 59 has a transverse portion 60 which supports bearing 61 for receiving one end of the common drive shaft 61' of the engine. The portion 60 connects with an annular portion 62 which is spaced inwardly from the outer casing 55 of the engine and the portion 62 carries three annular projections 63, 64 and 65 which are L-shaped in cross section. The projections 63, 64 and 65 have legs 66, 68 and 70, respectively, extending substantially parallel to shaft 61' and have legs 67, 69 and 71 extending radially from portion 62. Also, two annular members 72 and 73 have legs 75 and 77, respectively, positioned away from the shaft 61' and legs 74 and 76, respectively, extending radially for sealing purposes. The members 72 and 73 serve to divide the spaces between members 63, 64 and 65, since member 72 is positioned in the space between members 63 and 64 and member 73 is positioned in the space between members 64 and 65. The space between the leg 75 of member 72 and portion 62 defines the annular space 75' for heat exchanger unit 27 while the space between the leg 77 of member 73 and portion 62 defines the annular space 76' for heat exchanger unit 22. Also, the annular space between portion 62 and casing 55 defines an annular space 77' for heat exchanger unit 17. The other end of the shaft 61' is supported by bearings 78 and 79 which are carried by bearing support member 80 which is in turn secured to the support member 81 attached to end plate 56.

The stage 31 of the engine comprises a number of turbine wheels 83 which carry rows of blades 84 which co-operate with rows of stationary blades 85 which are carried by leg 66 of the projection 63. Also, the shaft 61' carries turbine wheels 86 having rows of rotating blades 87 which co-operate with rows of stationary blades 88 carried by leg 68 of projection 64. Turbine wheels 89 are likewise secured to shaft 61' and carry rows of rotating blades 90 which co-operate with rows of stationary blades 91 carried by leg 70 of projection 65. It is pointed out that the blades of each stage are larger than the blades for the preceding stage for the reason that each succeeding stage receives hydrogen gas at reduced pressure and higher volume even though the temperature entering each stage is the same.

The passage 15 from the hydrogen tank 12 connects with a circular header 92 which surrounds the casing 55 and a plurality of tubes 93 connect with header 92 and extend through the space 77' along the engine. Each of the tubes is shown as having a number of heat transfer fins 95 connected thereto. At the forward end of the engine, each of the tubes 93 is bent 180 degrees and passes through a space 96 defined by the member 80 and the portion 62. The tubes 93 and the fins 95 in the space 77' form the tube elements of the heat exchanger unit 17. The tube 93 extends through the leg 71 of projection 65 and into the space 76'. Within the space, each of the tubes 93 has fins 98 which extend the length of the space. Tube 93 passes from space 76' to space 75' and contains within this space a plurality of fins 100. Each of the tubes 93 then discharges into the space 101 defined by the projection 63 and the portions 60 and 62 of member 59. The tubes 93 and fins 98 form elements of heat exchanger unit 22, while the tubes 93 and fins 100 form elements of the heat exchanger unit 27.

The temperature of the hydrogen gas entering the space 101 is first raised in temperature in heat exchanger unit 17 and then reduced in temperature in heat exchanger units 22 and 27 to the temperature which will be withstood by the stage 31, comprised of blades 84 and 85. The high pressure gas in space 101 will expand through stage 31 and enter space 102 which leads to the space 75' containing the fins 100. The discharge from space 75' is through passage 103 which connects with the inlet to stage 33 and the hydrogen gas passing through space 75' will be increased in temperature to the maximum which can be withstood by stage 33. After expansion through stage 33, the hydrogen gas will enter the space 104 which leads to space 76, which contains the cooling fins 98 secured to tubes 93, and the gas will be heated in space 76' to the temperature which can be withstood by the third stage 37. The gas will enter this third stage 37 through passage 105 and the discharge from the stage will be into passage 96 which connects with space 94 containing the tubes 93 and fins 95. The passages 94 and 96 are separated by a perforated plate 106 which extends between the support member 81 and the portion 62. The plate has a conical portion 107, an axial portion 108 and a radial end portion 109 secured between support plate 81 and the casing 55. The openings 110 in the conical portion are the largest near the portion 62 and smallest near the axial portion 108. The portion 109 has an opening 111 which is co-axial with an opening 112 in the member 81. The opening 112 connects with an annular space 113 which receives the oxygen from the passage 44. Since the openings 110 adjacent section 108 are small, the velocity of the hydrogen passing through openings will be lower than the velocity through the larger openings. Thus, the space 114 will provide a mixing area for the hydrogen and oxygen which is characterized by a low velocity flow, whereas the space 115 will provide a space of higher velocity flow. A spark igniter 116 provides an ignition spark for space 114 and since the velocity in this space is low, this space will serve as the flame holder to propagate the flame into the higher velocity space 115. Thus, in spaces 114 and 115 a portion of the hydrogen exhausted from the last stage of the engine will be combusted with oxygen as the oxidant in order to increase the temperature of the exhaust. This increased temperature will serve to raise the temperature of the incoming hydrogen working fluid in passages 93 because of the heat transfer through the fins 95. The temperature of the gas in the tubes 93 leaving the heat exchanger unit 17 will thus correspond to the temperature in passage 20 of Figure 1, and the exhaust will pass through space 94 and into the chamber 57 which connects with the discharge passage 58. Thus, it is seen that the structural embodiment of the invention will operate in the same manner of the schematic form of Figure 1 in that the incoming hydrogen will be raised to a high temperature in heat exchanger 17 and this high temperature hydrogen will serve to increase the inlet temperature to stages 33 and 37 after the gas has been expanded through stages 31 and 33, respectively.

Referring to Figure 3, the shaft 61' connects with high speed reduction gear unit 116', which in turn connects by shaft 117 to a variable speed gear unit 118. This variable speed unit is connected by shaft 119 to a nose section 120 which carries two rows of compressor blades 121 and 122 which co-operate with two rows of stationary blades 123 and 124 which are carried by the duct 54. The air entering the inlet 125 of duct 54 is thus compressed by the compressor blades and is driven at high pressure through the duct and discharged at the nozzle 126 to produce thrust for the aircraft or other craft upon which the duct is mounted. The variable speed gear unit 118 is for the purpose of regulating the speed of the compressor, since it will be desirable in high altitude aircraft to run the compressor at higher speeds as the density of the air decreases. Since the oxygen supply is independent of the surrounding atmosphere, the engine can operate at high altitudes independent of the surrounding atmosphere.

In the modification illustrated in Figure 7, the hydrogen and combustion products leaving the passage 94 enter the chamber 57' which is connected through passages 127 to a plurality of flame holders 128 forming an afterburner 129 in which the hydrogen in the exhaust is continually ignited with the air within the duct 54 by means of spark igniters 130. Thus, the high pressure air within the duct behind the compressor is raised in temperature by the afterburner and additional thrust is obtained from the nozzle end 126 of the propulsion unit. The end of the inner body 52' is closed since the tube 58 of the prior embodiment is eliminated and the exhaust is connected to the afterburner through passages 127. In this embodiment of the invention, all of the hydrogen can be combusted to provide thrust for the aircraft, whereas in the embodiment of Figure 3, some hydrogen is exhausted into the duct.

Referring to the embodiment of the invention illustrated in Figures 8 and 9, the engine 11 is mounted within an inner body 52" and the engine exhausts from the chamber 57' through the passages 127 into the flame holders 128 so that the hydrogen gas in the exhaust from the engine will be burned in the afterburner 129 to produce additional thrust from the propulsion unit in the same manner as the embodiment of Figure 7. However, means are provided in the embodiment of Figure 8 for utilizing either oxygen or air as the oxidant for the engine. For this purpose an air scoop 131 is secured to the casing of the engine and projects through the inner body 52" into the air stream. A circular ring 133 surrounds the engine casing 55 and contains a plurality of spaced openings 134 which can be rotated into alignment with a plurality of openings 135 located in casing 55. Thus, the high pressure air in the scoop 131 will enter through the casing 55 to the low velocity space 114 where it will be ignited with the hydrogen from passage 96 by igniter 132 positioned in a low velocity area. During the time that air is utilized as the oxidant, the flow of oxygen through passage 44, space 113 and openings 112 and 111 can be closed off by regulator 136. The openings 135 and 134 are relatively small to provide only enough air to raise the temperature of the combustion products the desired amount. When air is used as the oxidant at relative low altitudes where the density of the air is relatively high, the size of the openings can be reduced by rotation of ring 133. Also, at very high altitudes where the air density is very low, the ring 133 can be moved to interrupt the connection between openings 134 and 135 and at this time, regulator 136 can be opened to supply oxygen to the low velocity space 114 from passage 44. Also, at intermediate altitudes, the ring 133 can be adjusted so that a regulated quantity of air enters the low velocity space 114 and at the same time, a regulated quantity of oxygen can be supplied to this space so that the engine can operate on a mixture of air and oxygen as the oxidant. By utilizing air as the oxidant during relatively low altitude flight, it is possible to reduce the amount of liquid oxygen carried in tank 14 as the oxidant for the engine. Thus, the embodiment of Figure 8 provides a propulsion unit which utilizes an afterburner to burn the hydrogen in the exhaust from engine 11 and permits very high altitude flight with a minimum of weight carried by the aircraft in the form of an oxidant.

By the present invention a novel multistage high altitude engine is provided in which the single combustion chamber 39 is not an integrated part of the engine in that various oxidants can be utilized depending upon the conditions under which the engine will be operated. The only requirement of the combustion chamber 39 is that it combusts sufficient hydrogen with an oxidant to increase the temperature of the hydrogen working fluid leaving heat exchanger unit 17 to the required value. When the engine is utilized as a propulsion unit for an aircraft, it is possible to utilize air from a compressor driven by the engine as the oxidant under certain flight conditions. Also, the arrangement of the combustion chamber permits a change from air to oxygen when higher altitude flight conditions demand oxygen as an oxidant. Of course, any other suitable oxidant other than oxygen can be carried by the aircraft for combustion with the hydrogen. The use of afterburners with the engine provides maximum efficiency and maximum thrust since all of the hydrogen delivered to the engine is utilized as fuel. It is understood that the engine is not limited in its application to the propulsion of aircraft and that various changes can be made in the structural arrangement of the engine component. Various other modifications are contemplated by those skilled in the art without departing from the spirit and scope of the invention as hereinafter defined by the appended claims.

What is claimed is:

1. A method of producing power comprising the steps of introducing substantially pure hydrogen to an expansion engine, expanding the introduced hydrogen through the engine to produce power, introducing into the substantially pure hydrogen exhausted from the engine an oxidant in an amount sufficient to support combustion of a portion only of said hydrogen, combusting such portion only of the hydrogen with said oxidant to obtain a heating medium rich in hydrogen and of high specific heat, and passing said heating medium in heat exchange relationship with the hydrogen introduced to the engine to increase the temperature of the introduced hydrogen prior to expansion.

2. A method as defined in claim 1 which includes the step of regulating the amount of oxidant introduced to said substantially pure hydrogen exhausted from the engine to control the temperature of the hydrogen rich heating medium.

3. A method of producing power comprising the steps of introducing substantially pure hydrogen to a multi-stage expansion engine, expanding the introduced hydrogen through the engine to produce power, introducing into the substantially pure hydrogen exhausted from the engine an oxidant in an amount sufficient to support combustion of a portion only of said hydrogen, combusting such portion only of the hydrogen with said oxidant to obtain a heating medium rich in hydrogen and of high specific heat, passing the heating medium in heat exchange relationship with the introduced hydrogen prior to expansion thereof to heat the introduced hydrogen to a temperature higher than the safe operating temperature of the engine, and passing the thus heated hydrogen in heat exchange relationship with hydrogen at the inlet to each stage except the first stage to heat the hydrogen entering each stage to the safe operating temperature of that stage and to reduce the temperature of the introduced hydrogen to the safe operating temperature of the first stage.

4. A multistage engine comprising a casing, a drive shaft located within said casing and carrying a plurality of expansion stages, a separate annular space connected to the inlet of each of the stages except the first stage, heat exchanger means located in each of said spaces and connected together in series, an annular chamber within said casing containing heating means connected to the heat exchanger means located at the inlet to the last stage, means for introducing hydrogen gas to said heating means for use as a working fluid, and combustion means positioned between the exhaust from the last stage and the inlet to said annular chamber in order to combust a portion of the hydrogen gas in the exhaust from the last stage with a separate oxidant supply to provide a heating medium for said heating means, the temperature of the hydrogen in said heating means being raised above the temperature which can be withstood by the expansion stages so that the high temperature hydrogen can be utilized in said heat exchanger means to raise the inlet temperature to all stages except the first stage to the maximum temperature that can be withstood by each stage and the temperature of the hydrogen exhausting from said heat exchanger means will be at the maximum which can be withstood by the first stage.

5. A multistage engine as defined in claim 4, wherein said combustion means is located at one end of said casing where the flow passage of the exhaust from the last stage to said annular chamber is reversed, said combusting means comprising a member positioned at an angle in said flow passage, said member having holes of decreasing diameter starting from one edge thereof and a portion without holes at the other end thereof to provide an area of low velocity behind said member, means for introducing said oxidant supply to said low velocity area and means positioned in said low velocity area for igniting said oxidant supply with a portion of the hydrogen gas exhausted from the last stage.

6. A multistage engine as defined in claim 4, wherein said heat exchanger means for each of the stages are located lengthwise of the engine and inwardly from said heating means, said heating means extending lengthwise of the engine and substantially the complete length of said engine.

7. A multistage engine as defined in claim 6 wherein each of said heat exchanger means comprises a plurality of tubes located in said annular space for each heat exchanger means, and said heating means comprising a plurality of tubes located in said annular chamber, and a plurality of heat transfer fins connected to the tubes of said heat exchanger means and said heating means.

8. A multistage engine as defined in claim 5, having an air scoop located exteriorly of said casing and connecting with said low velocity area through a plurality of openings in said casing and regulating means for regulating the quantity of air introduced to said area through said openings for use as an oxidant supply.

9. A multistage engine as defined in claim 8, having means for providing a supply of oxygen for use as an oxidant supply, passage means for connecting the oxygen to said low velocity area, valving means positioned in said passage means for regulating the quantity of oxygen supplied to said area, said regulating means and valving means permitting either air or oxygen or a mixture of air and oxygen to be used as the oxidant supply.

References Cited in the file of this patent

UNITED STATES PATENTS

| | | |
|---|---|---|
| 263,311 | Browne | Aug. 29, 1882 |
| 615,311 | Schmidt | Dec. 6, 1898 |
| 1,954,823 | Lucke | Apr. 17, 1934 |
| 2,091,808 | Dake | Aug. 31, 1937 |
| 2,455,845 | Wells | Dec. 7, 1948 |
| 2,620,625 | Phaneuf | Dec. 9, 1952 |

FOREIGN PATENTS

| | | |
|---|---|---|
| 468,287 | Great Britain | July 1, 1937 |
| 583,146 | Great Britain | Dec. 10, 1946 |